(12) United States Patent
Viehweider et al.

(10) Patent No.: US 10,734,812 B2
(45) Date of Patent: Aug. 4, 2020

(54) RENEWABLE POWER SYSTEM AND SIZING METHOD FOR CONTROLLABLE PLANT ASSOCIATED WITH RENEWABLE POWER SYSTEM

(71) Applicant: NEC Corporation, Minato-ku, Tokyo (JP)

(72) Inventors: Alexander Viehweider, Tokyo (JP); Koji Kudo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 233 days.

(21) Appl. No.: 15/735,657

(22) PCT Filed: Jul. 8, 2015

(86) PCT No.: PCT/JP2015/003432
§ 371 (c)(1),
(2) Date: Dec. 12, 2017

(87) PCT Pub. No.: WO2017/006371
PCT Pub. Date: Jan. 12, 2017

(65) Prior Publication Data
US 2018/0366951 A1    Dec. 20, 2018

(51) Int. Cl.
*G05B 19/042* (2006.01)
*H02J 3/38* (2006.01)
(Continued)

(52) U.S. Cl.
CPC ............ *H02J 3/382* (2013.01); *G05B 19/042* (2013.01); *G06Q 50/06* (2013.01); *H02J 3/00* (2013.01);
(Continued)

(58) Field of Classification Search
None
See application file for complete search history.

(56) References Cited

U.S. PATENT DOCUMENTS 9,509,176 B2 * 11/2016 Carter ................. G05B 19/0428
2012/0133337 A1 * 5/2012 Rombouts ............... B60L 53/63
320/155
(Continued)

FOREIGN PATENT DOCUMENTS

JP      2011-114900 A     6/2011
JP      2011-114945 A     6/2011
(Continued)

OTHER PUBLICATIONS

International Search Report for PCT Application No. PCT/JP2015/003432, dated Sep. 15, 2015.
(Continued)

*Primary Examiner* — Thomas C Lee
*Assistant Examiner* — Gary Collins

(57) ABSTRACT

A renewable power system according to the exemplary embodiment includes a renewable power plant (121), a controllable plant (123) and an energy management system (128) which keeps an energy schedule within a certain tolerance in the next k (an integer greater than or equal to 1) steps by using a method that includes an optimization algorithm for a total power output shape within a step, and schedule changing algorithm for changing the energy schedule after the next k steps to keep a needed capacity of the plant regarding power and energy small. By keeping the energy schedule within a certain range for a renewable power plant combined with controllable plant, it is possible to keep the needed power and energy capacity of controllable plant small and to guarantee favorable total power output shape.

7 Claims, 16 Drawing Sheets

(51) Int. Cl.
*H02J 3/32* (2006.01)
*H02J 3/00* (2006.01)
*G06Q 50/06* (2012.01)

(52) U.S. Cl.
CPC ........ *H02J 3/32* (2013.01); *G05B 2219/2639* (2013.01); *H02J 3/003* (2020.01); *Y02E 70/30* (2013.01)

(56) References Cited

U.S. PATENT DOCUMENTS

| | | | |
|---|---|---|---|
| 2013/0190938 A1* | 7/2013 | Zadeh | H02J 13/0013 700/291 |
| 2014/0094980 A1 | 4/2014 | Saito et al. | |
| 2014/0129040 A1* | 5/2014 | Emadi | G06Q 50/06 700/291 |
| 2014/0257585 A1* | 9/2014 | Kubota | H02J 3/32 700/291 |
| 2014/0350743 A1* | 11/2014 | Asghari | G05B 13/048 700/297 |
| 2014/0358316 A1 | 12/2014 | Shichiri | |
| 2016/0043548 A1* | 2/2016 | Bozchalui | G05B 13/041 700/291 |

FOREIGN PATENT DOCUMENTS

| | | |
|---|---|---|
| JP | 2013-150489 A | 8/2013 |
| JP | 2014-174735 A | 9/2014 |
| JP | 2015-035941 A | 2/2015 |
| JP | 2015-037355 A | 2/2015 |
| WO | 2013/128953 A1 | 9/2013 |

OTHER PUBLICATIONS

English translation of Written opinion for PCT Application No. PCT/JP2015/003432.

* cited by examiner

Fig. 15

Optimization principle

- Battery power vector $x = [x_1, x_2, \text{K}, x_n]$
- Generated power vector $z = [z_1, z_2, \text{K}, z_n]$
- Total output power $y = x + z$
- Total output energy $E = \Delta T \sum_{i=1}^{n} y_i$

- Optimization criteria $\min_x \left( w_1 \rho_e(x) + w_2 \rho_p(x) + w_3 \rho(x) \right)$
  In the deterministic, robust stochastic or scenario based sense

- First criteria $\rho_e(x) = \max_i e_i - \min_l e_l$  Minimize energy capacity $e_i = \sum_{m=1}^{i} x_i$

- Second criteria $\rho_p(x) = \max_i x_i$  Minimize power capacity

- Third criteria $\rho(x)$  Battery degradation function

Constraints

- Energy schedule constraint:
  $(1 - a_i)S \leq \sum_{r=1}^{n}(x_r + y_r) \leq (1 + b_i)S$

- Device constraint
- Power output shape constraint:
  $\text{Ex.} |y_{i+1} - y_i| < d_i$
  Other shape constraints...

Grid conformant power shape

From grid state, current grid operation

Fig. 16

| Future Price/ Future Uncertainty | U. low | U. high |
|---|---|---|
| P low | $k_1i$ high, $k_2i$ high<br>SoC, des, i set to medium level | $k_1i$ low, $k_2i$ high<br>SoC, des, i set to medium level |
| P. high | $k_1i$ high, $k_2i$ low<br>SoC, des, i set to higher level | $k_1i$ low, $k_2i$ low<br>SoC, des, i set to higher level |

# RENEWABLE POWER SYSTEM AND SIZING METHOD FOR CONTROLLABLE PLANT ASSOCIATED WITH RENEWABLE POWER SYSTEM

This application is a National Stage Entry of PCT/JP2015/003432 filed on Jul. 8, 2015, the contents of all of which are incorporated herein by reference, in their entirety.

TECHNICAL FIELD

The present invention is related to a renewable power system and a sizing method for controllable plant associated with the renewable system.

BACKGROUND ART

Renewable energy resources have high volatility and therefore, they are difficult to predict and a predicted (calculated) schedule cannot be kept by the renewable power plant with desired accuracy.

In future, more and more independent power producers (PPS—power producer and supplier company) will enter the traditional grid (in Japan and elsewhere). They will rely heavily on renewable power plants. Grid stability (supply/demand balance) will be an important issue. New market mechanism (or already existing market mechanism that have not yet been exploited) will play an important role.

Patent literatures 1 to 5 disclose techniques of optimizing the operation schedule of a control-target device, such as an energy supplying device or an energy storage device. In patent literature 1, for example, an operation schedule of the control-target device is optimized in such a way that a predetermined evaluation index, such as the consumed energy or the energy cost, is minimized. The necessity of the re-scheduling is determined by comparing actual operation data with the control setting value based on the operation schedule at a preset timing.

CITATION LIST

Patent Literature

PTL 1: International Patent Publication No. WO 2013/128953
PTL 2: Japanese Unexamined Patent Application Publication No. 2015-037355
PTL 3: Japanese Unexamined Patent Application Publication No. 2014-174735
PTL 4: Japanese Unexamined Patent Application Publication No. 2013-150489
PTL 5: Japanese Unexamined Patent Application Publication No. 2011-114900

SUMMARY OF INVENTION

Technical Problem

The techniques described in above patent literatures cannot reduce effectively battery size and does not exploit in the best way the degrees of freedom that this problem has since above methods are based on some threshold based rules or flowchart based rules.

The uncertainty of the prediction is difficult to introduce and only considered in a suboptimal way. Battery (or other controllable plant) sizing approaches do not consider the peculiarities of the electric energy system, prediction methods properties and/or smart market conditions.

Solution to Problem

A renewable power system having a renewable power plant and a controllable plant, comprising;
an energy management system which keeps an energy schedule within a certain tolerance in the next k (an integer greater than or equal to 1) steps by using a method that includes an optimization algorithm for a total power output shape within a step, and schedule changing algorithm for changing the energy schedule after the next k steps to keep a needed capacity of the plant regarding power and energy small.

Advantageous Effects of Invention

By keeping the energy schedule within a certain range for a renewable power plant combined with controllable plant, it is possible to keep the needed power and energy capacity of controllable plant small and to guarantee favorable total power output shape.

BRIEF DESCRIPTION OF DRAWINGS

FIG. 15 is a diagram showing an overview of optimization principle;
FIG. 16 is a diagram showing characteristics for parameter change.

DESCRIPTION OF EMBODIMENTS

Figure 1:
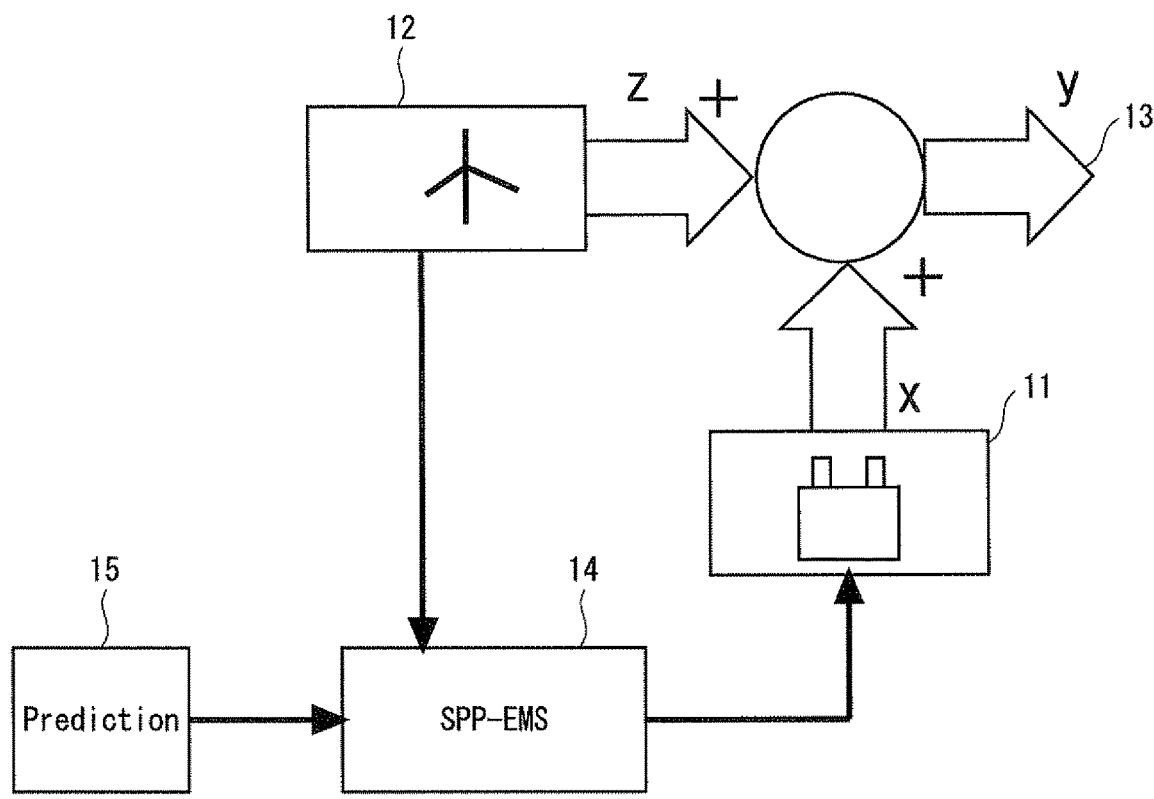
FIG. 1 is a diagram showing a system overview having a renewable power plant in combination with a controllable plant (in an exemplary embodiment, battery)

The present inventors have noticed following problems.

Problem I: Battery size may be larger than needed in the above patent literatures. Scheduling control methods in the above patent literatures are not optimal when it comes to reducing battery size for the purpose of a "'schedulable' renewable power plant" comprising of renewable power plants and batteries considering prediction uncertainties.

Problem II: Power profile within one step size may be un-favorable as far as grid operation is concerned in the above patent literatures. If only flowchart based logic is used to control the power output of the battery (the controllable plant) in the renewable power plant system, the power profile may be unfavorable because of a lot of reasons, for example, the power output trajectory is too steep, jumps, or discontinuities.

Problem III: Power profile may not consider grid operation characteristics or grid operation state leading to a major stability and/or additional cost problem in the above patent literatures.

Problem IV: The techniques in the above patent literatures do not consider sizing methods based on tolerable "not-fulfillment (at least partially) of energy schedule/service" considering electric power company (system) operation properties, operations and market costs (i.e. the market cost as it is now and/or the smart market cost in the future). This leads to a very large battery capacity (power capacity, energy capacity). The purpose of this invention is to solve the above problems I, II III, and IV.

The present invention is related to a use of renewable energy resources introduction in an electric grid and, particularly, to a system having a renewable power plant(s) and a controllable plant(s). In this specification, the renewable power plant is assumed to be non-controllable or has limited control capabilities. Further, the controllable plants are associated equipment which are combined with the renewable power plant. The controllable plant is any one of an energy supplying device, an energy consuming device and an energy storage device.

The energy supplying device includes, for example, a fuel based generators that have a limited storage for fuel. The energy storage device includes, for example, a battery as described above. The energy consuming device includes, for example, a controllable load considering batch processes of special kind. The meaning of batch processes of special kind is that the load is used to process something and if the processed batch runs out, the energy supplying device should provide no longer power to this load since it would be a waste of energy.

In the present invention, the renewable power plant can make energy per step size 'schedulable' in the next k steps (k is an integer greater than or equal to 1) by using the controllable plant like the energy storage device such as the battery. A typical step size could be half an hour and k steps could be for example 6 or 8 steps. The controllable loads or the fuel based generators can also be considered of this kind.

By using this invention, the controllable plant (battery or controllable load and so on) size is reduced for this task. Further, the total power output (from the renewable power plant and the battery) shaped favorably. The prediction error properties are considered and the exemplary embodiment makes use of it for achieving best results (keeping energy schedule, reducing storage-battery size (power and energy) and optimizing total power output shape considering the constraints).

INTRODUCTION

The volatile quality of produced power (energy) from renewable power plants creates problem for overall operation of the electric grid. All over the world, electric power grids have already had mechanisms to guarantee supply/demand balance and stability in the grid (for example, a primary control—a free governor mode, a secondary control—a load frequency control, and a tertiary control). These so called ancillary services need extra spare capacities in order to be used when it is necessary to keep the operation of the electric grid stable.

With the wide spread and large scale introduction of renewable power plants, additional measures are necessary also considering the overall economic aspect. One possible way is to combine the renewable power plant (assumed to be non-controllable or with limited control capabilities) with a controllable plant (plant, load and/or battery). In order to guarantee overall economic operation, the needed controllable energy and power capacity should be reasonable small. In order to achieve this goal following energy management system and associated equipment sizing method is introduced.

Description of the System

What follows is the description of the SPP-EMS (Schedulable Power Plant—Energy Management System) of an exemplary embodiment of this invention and associated battery sizing method.

FIG. 1 shows the configuration of the exemplary embodiment to introduce the energy management system to which the sizing method applied. A renewable power plant 12 which output power can in general not be controlled is connected with a controllable plant (generator, load, or battery). In FIG. 1, the controllable plant is a battery 11. A total output power 13 of the two power sources (the battery 11 and the renewable power plant 12) should fulfill certain criteria. In order to achieve this task an Energy Management System (EMS) is used. For the purpose of this invention the EMS in this specification is called "Schedulable" Power Plant (SPP)—EMS (SPP-EMS 14). The SPP-EMS 14 basically has access to the measured power of the renewable power plant 12 and access to information from a prediction unit 15.

Figure 2:
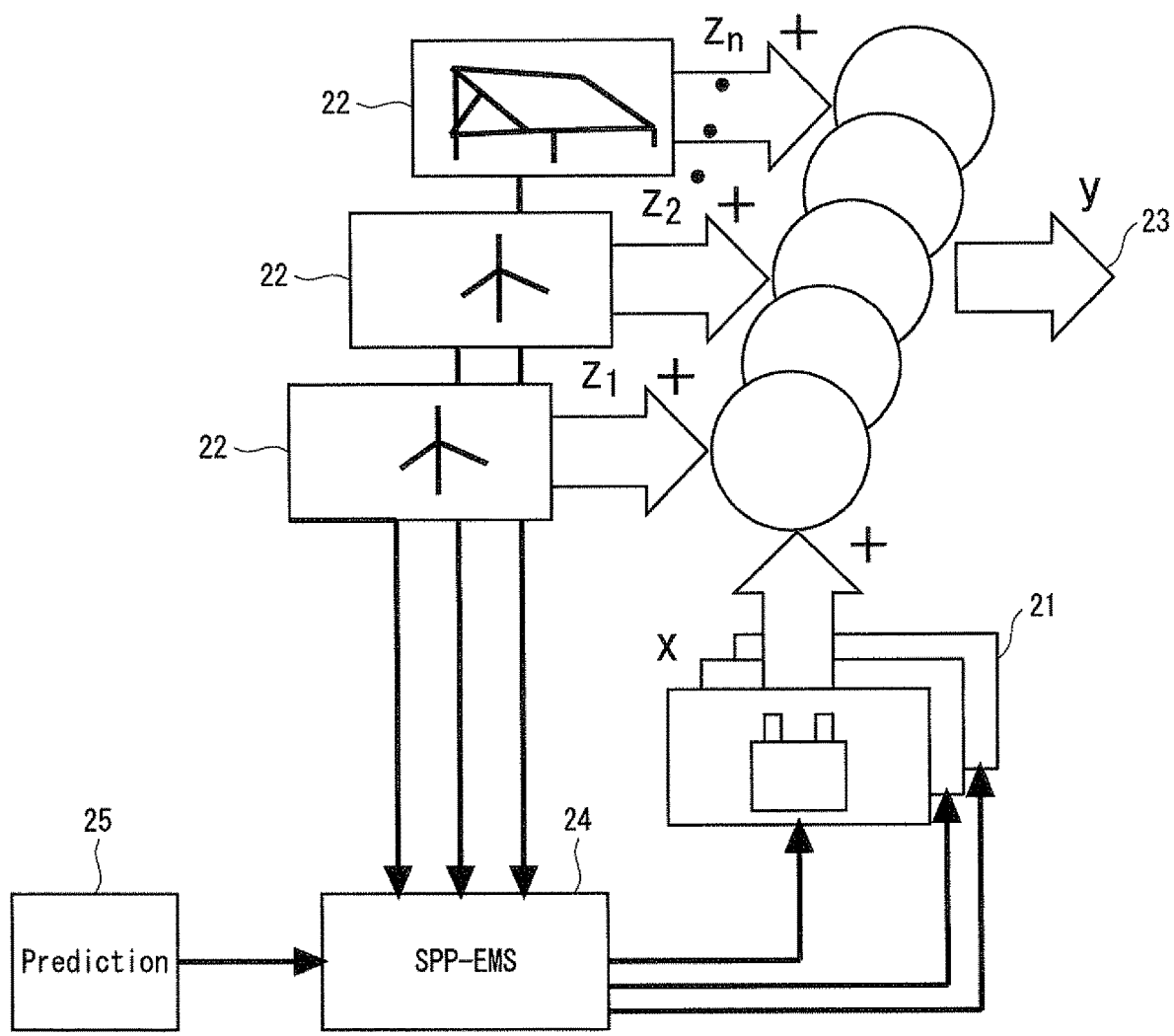
FIG. 2 is a diagram showing a system overview having multiple renewable power plants and controllable plants (in an exemplary embodiment, multiple batteries)

The configuration can be generalized as shown in FIG. 2. The difference is that a plurality of renewable power plants 22 is feed into the grid. The plurality of renewable power plants 22 include, for example, photovoltaic (PV) plant or wind power plant and so on. Various controllable plants (in FIG. 2, batteries 21) are combined with the renewable power plants 22. The total output power 23 of the combination of the renewable power plants 22 with the batteries 21 is considered. Using the same units (a SPP-EMS 24 and a prediction module 25) as the SPP-EMS 14 and the prediction module 15 shown in FIG. 1, the task to have a favorable total output power of the considered system should be achieved.

Task to Achieve

Figure 3:
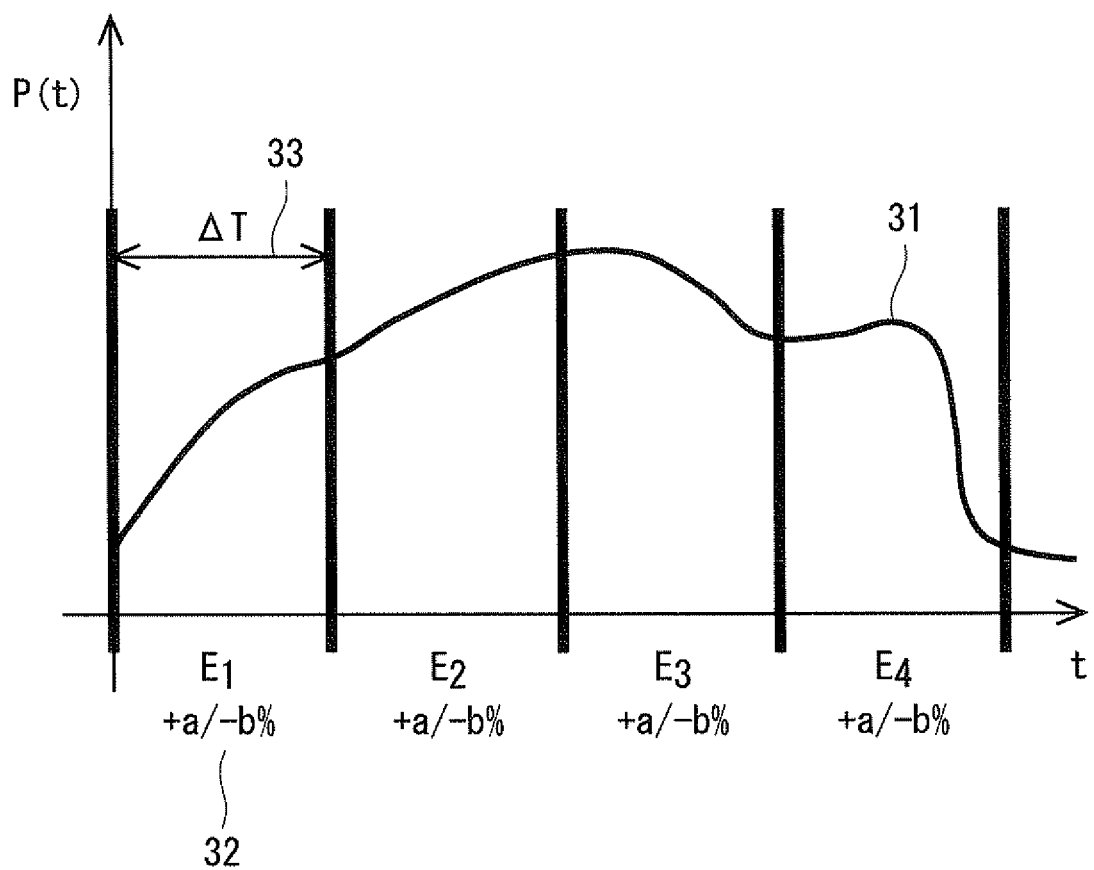
FIG. 3 is a diagram showing a power profile with relevant interval for single step of an energy schedule.

The main task to achieve is explained with FIG. 3. Within a defined time interval (step) i, a certain amount of energy Ei 32 must be produced with the combination of the renewable power plant and the controllable plant. The energy Ei 32 includes a scheduled energy and a tolerance. Usually, this amount of energy Ei 32 is positive. In combination with a load, however, the amount of energy can also be negative. The defined time interval i typically is in the range of 30 min or more. The defined time interval i is shown in FIG. 3 as ΔT (a step-size 33). The step size 33 is a length of the considered minimal interval for energy scheduling.

The energy that has to produced (or consumed) is known in beforehand and denominated as scheduled energy. Deviations from this amount of energy are allowed. A tolerance band is indicated by $$((1-a_i)E_{i,s} \leq E_i \leq (1+b_i)E_{i,s}),$$

where ai and bi are the two tolerance parameters given beforehand (For example, ai=0.1 (10%), bi=0.2 (20%)). The relative or absolute allowed deviations are constant or depend on the grid operation state.

The energy is considered over the time interval. Within this time interval, the power output should also fulfill certain criteria (for example, shape criteria, no major jumps in the power output, moderate or no discontinuity, maximal slope etc.). The criteria for the power output shape may or may not depend on the grid operation state (for example, they may depend on how much capacity is available for primary and secondary control). These two tasks (energy schedule task, power output shaping task) should be achieved in an economical way. This means that the needed controllable energy capacity and power capacity of the controllable plant (usually battery) should be as small as possible so that the three tasks can be summarized. The three tasks are as follows: I) the energy schedule, II) the power output shape and III) a resource minimization (capacity and market).

Description of the Method

The SPP-EMS (Schedulable power plant energy management system) should guarantee the energy schedule and the power output shape under the constraint of small needed controllable energy and power capacity of the controllable plant. This is achieved by making the system "schedulable" for a certain interval. The certain interval is typically k steps, for example, 8 steps of 30 min. The system is scheduled for the interval of 8 steps of 30 min means that it is scheduled for the next 4 h. The meaning of "schedulable" is that the total output power follows a predefined energy schedule within a certain tolerance.

The energy schedule is derived from the energy prediction for the power sources (the renewable power plant and the controllable plant). The energy schedule is changed in a particular way (referred to as "a schedule changing method") and can be summarized by the following formula:

$$E_{corr,sched}(i+k) = E_{pred}(i+k) \pm k_{1,i} F1\{(E_{real}(i) - E_{pred}(i))\} + k_{2,i} F2\{(SoC(i) - SoC_{des,i})\},$$

where F1{.} and F2{.} are operators in the mathematical sense (for example, differential operator) and the practical implementation is with digital filters.

Figure 4:
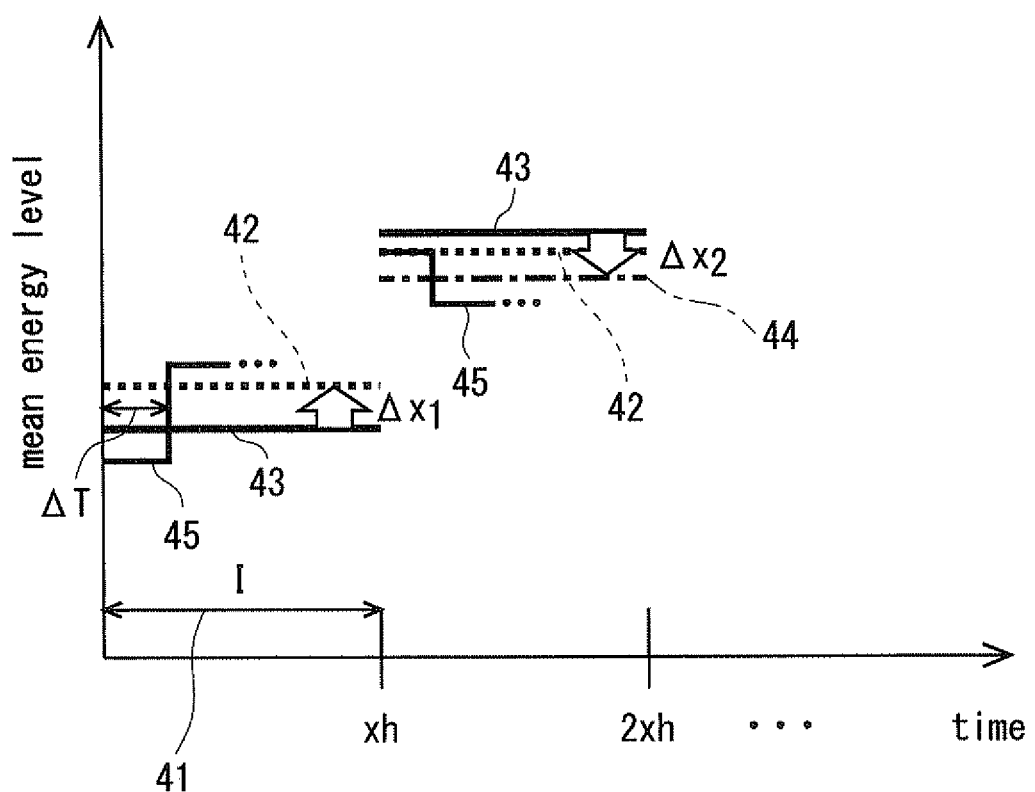
FIG. 4 is a diagram showing a principle of schedule prediction-correction algorithm.
Figure 6:
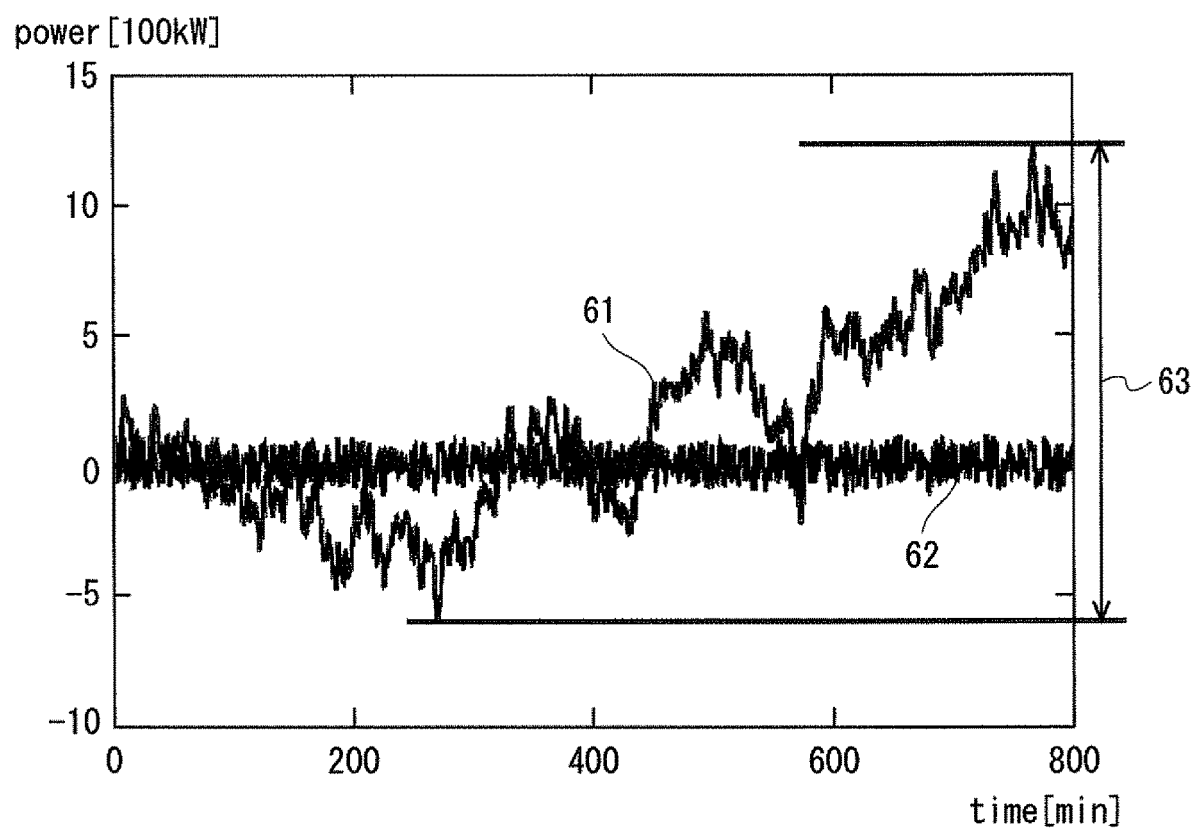
FIG. 6 is a simulation result showing a needed battery capacity without a schedule-changing algorithm.
Figure 7:
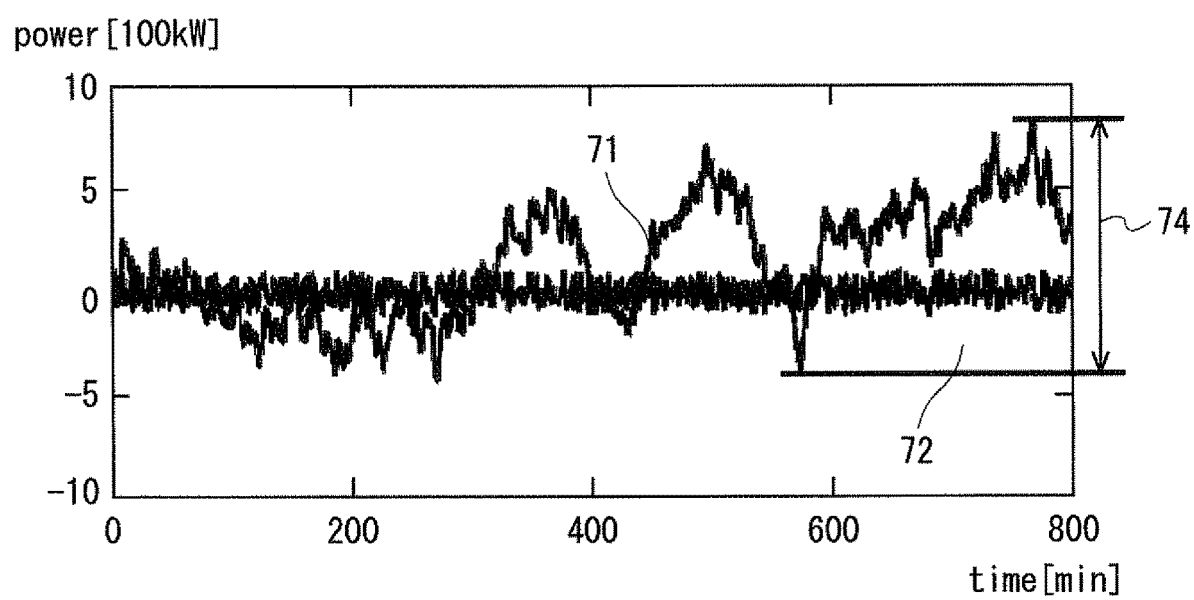
FIG. 7 is a simulation result showing a needed battery capacity with a schedule-changing algorithm.
Figure 8:
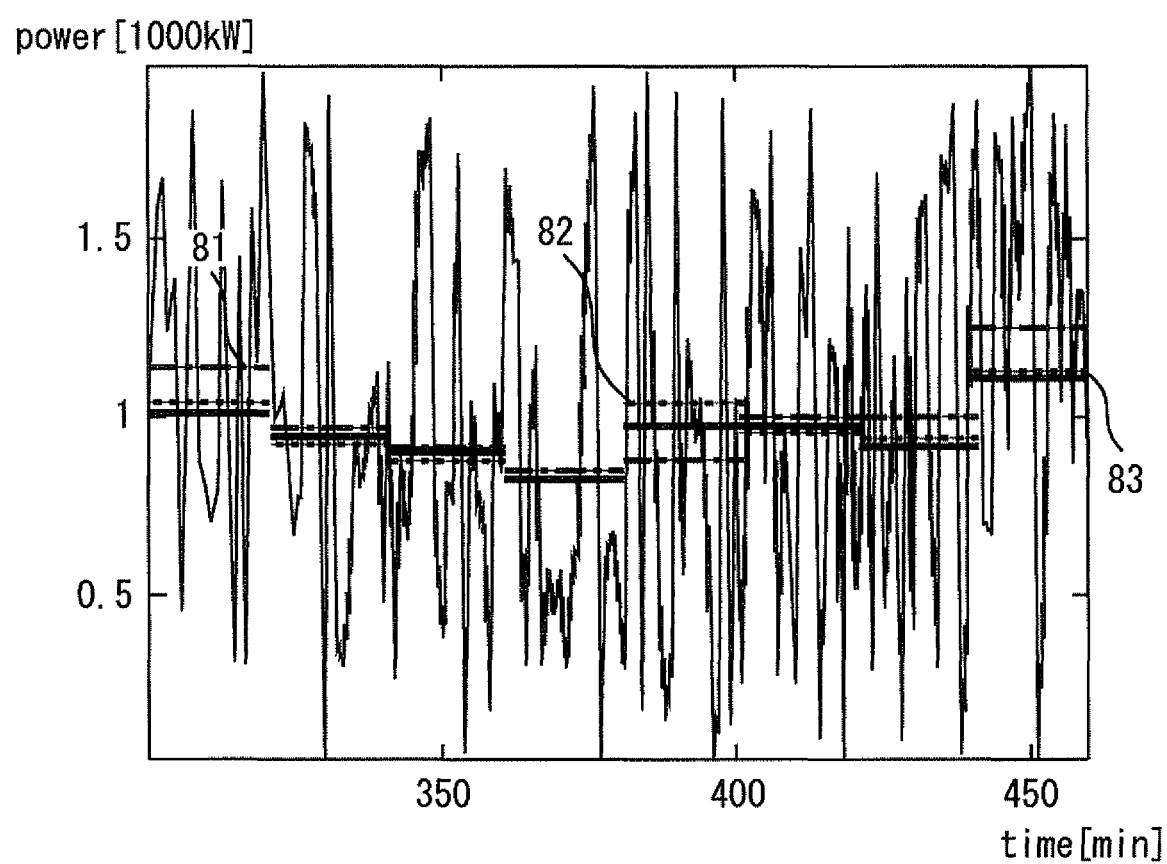
FIG. 8 is a detailed simulation result showing an operation simulation of a schedule-changing algorithm.

The scheduled energy production Ecorr,sched after k steps (time instant ti+k) differs from the predicted energy production as far as the weighted difference in energy production at the interval i is concerned and the weighted difference form the state of charge (an energy state of the controllable plant) is concerned. The weights k1,i and k2,i are in general time variant (slowly time variant) and may depend on the uncertainty of the prediction, the grid operation state and market condition. Some grid operation state and/or uncertainty in the prediction may make it necessary to keep the battery at a certain level. These parameters must be chosen in a way that the whole system runs stable. It can be checked with classical control theory criteria. FIG. 4 shows a principle of schedule prediction-correction algorithm. FIGS. 6 and 7 respectively show simulation results without/with this schedule changing method. In FIG. 8, detailed simulation results are shown.

Figure 9:
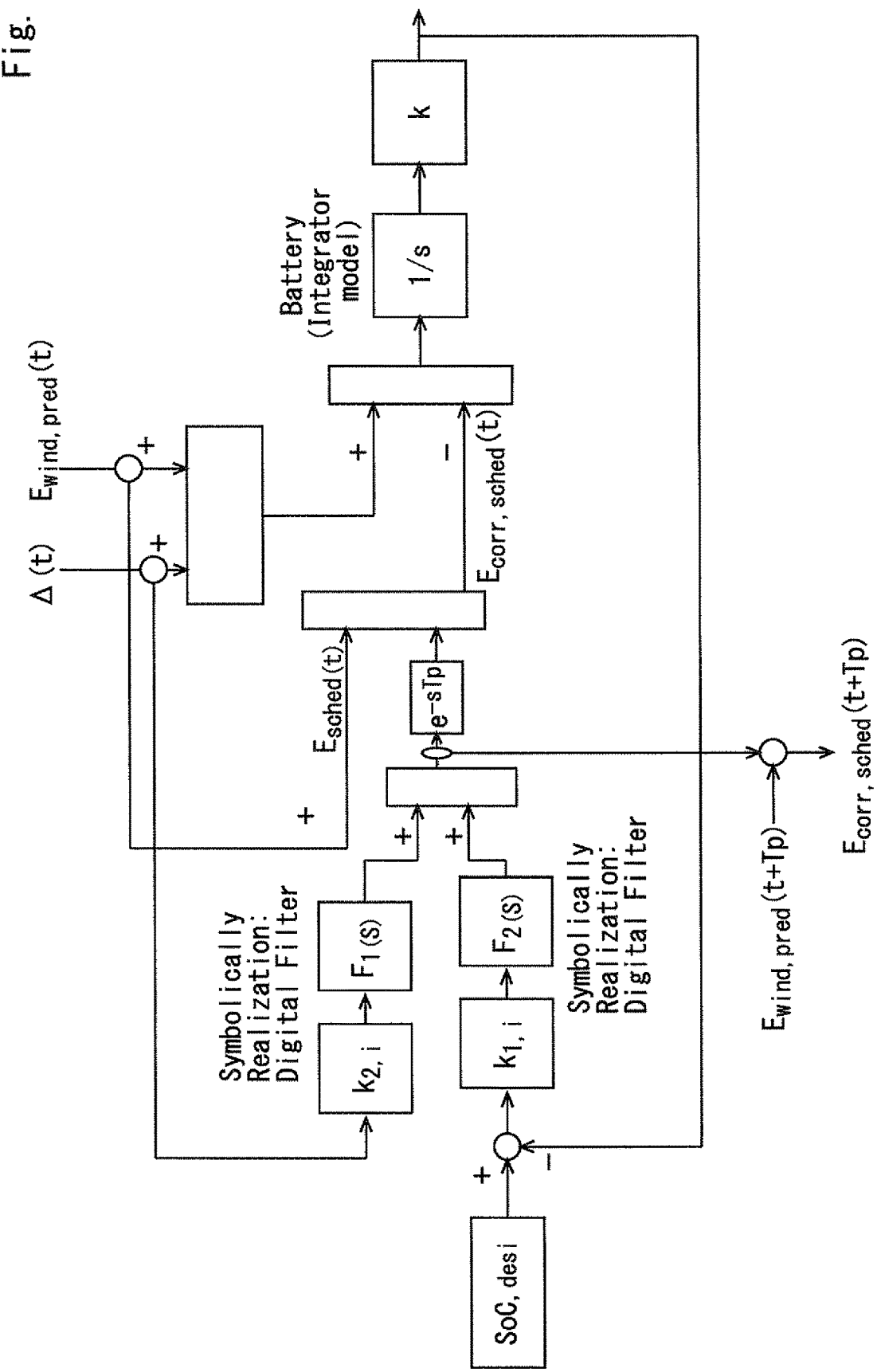
FIG. 9 is a diagram showing a signal flow of the method for determination of stability according to an exemplary embodiment.

It is pointed to FIG. 9, the basic principle should be elucidated. It is a signal flow diagram which shows the basic mechanism in a control engineering notation. It is shown in continuous time domain, which does not exactly show the way in which it is implemented, but the idea should get across. The battery can be considered as an "integrator unit" (having storage property). The factor k just relates to energy SoC (State of Charge) level in %.

What affects the battery is the difference between scheduled energy and real produced energy. The diagram shown in FIG. 9 mixes to some degree power and energy. For this purpose, the energy indications are considered as power over the considered time step (typically 30 min). The scheduled energy consists of two parts: one of these parts is the predicted power output of the power sources, and a so called a "schedule correction" contribution. If prediction gives us not only a single value, but a distribution, the predicted power output of the power sources is typically the expectation value. The "schedule correction" is a term that "cares" in some way for the energy SoC of the battery fulfilling different criteria.

The parameter k1,i and k2,i must be chosen in a way that system stability is given. It is not the purpose of this application to explain basic control theory. In this exemplary embodiment, a problem is surely the prediction range (that is "k steps schedulable"). Since the prediction range is translated into a delay in this scheme together with the basic integrator property of the battery (90 degrees phase lag), and it leads to instability. In order to enlarge the stability range, the two digital filters are used to "recover phase". For example, filters satisfying $F1(s)=s/(1+sT1)$, where T1 is a small time constant for realization of this filter, can be used.

Apart from system stability, the parameters k1,i and k2,i are chosen in a way where the system runs optimal.

This can be determined by basic rules as shown in FIG. 16.

The schedule changing algorithm implications are shown in FIG. 4. In FIG. 4, single time interval (step) and considered time interval (k steps) for the schedule change are shown. Further, duration of correction interval 41 (k steps) is denoted by "I". A realized mean power 42 is a mean energy level from renewable plant(s). A predicted mean power 43 is derived from predicted energy per one step in the preliminary schedule. As shown in FIG. 4, a real mean energy level (a realized mean power 42) is different than predicted energy level (the predicted mean power 43). Therefore a new mean energy level is set as a changed energy schedule 44 to keep energy capacity low. FIG. 4 shows a basic idea of the prediction correction method. The concrete application of the method leads to a schedule change after each time step delta T.

The algorithm gives a schedule for the next k steps. The battery energy level without application of the schedule changing algorithm of this invention (a resulting energy level (integral over battery power) without prediction correction method 61) is shown in FIG. 6. The resulting energy level 61 is derived from the power of the renewable energy resource (a battery power 62) and a prediction error. The resulting battery power (x) is a difference between the (scheduled) output (y) and the produced renewable energy (z) (i.e. x=y-z). The total power output 61 determines the battery energy capacity (as indicated by a needed battery capacity for compensation 63).

As shown in FIG. 7, with the application of the schedule changing algorithm of this invention, the needed battery capacity 74 is quite reduced. In the simulation, the reduction is around 30%.

In FIG. 8, the relation between a predicted energy (a corrected mean output power level given by the other energy schedule 83), a scheduled energy (a predicted mean output power level 81) and a realized energy (a realized mean output power level 82) are shown as mean power level for the aforementioned simulation example.

Figure 5:
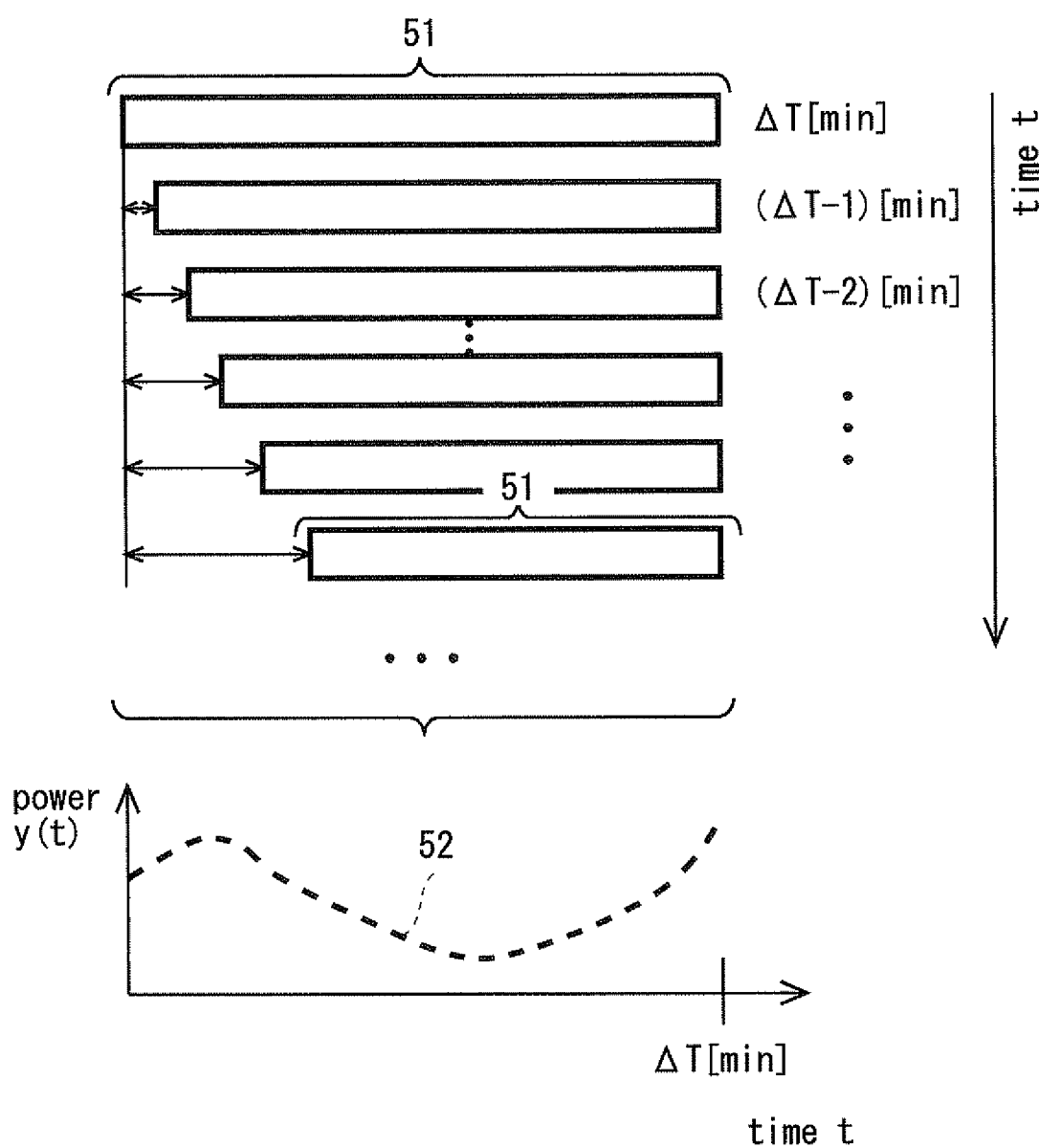
FIG. 5 are a diagram showing a considered power output shaping optimization interval within one step over time (top part) and a graph showing a resulting power output shape (bottom part)

The power output shaping method uses the schedule that is determined before and calculates optimal power output at each instant considering a time dependent consideration window size as shown in FIG. 5. As can be seen in FIG. 5, an optimization interval for optimal power sequence computation 51 gets shorter as the end of the step (typically 30 min) is approached. The considered power output shaping optimization interval within one step over time is from the length of a step (typically 30 min) to the minimal optimization interval (for example, 1 min). The result of all the optimization windows is the concrete total power output result 52.

The optimization takes into account the minimization of the needed energy capacity and the power capacity (maximal power). Favorable power output shapes depend on grid characteristic (and current grid state) and minimization of battery degradation. It is constrained by the scheduled energy which considers the general time variant tolerance bounds and other criteria. It can be summarized symbolically by following:

$$\min_x (w_1 \rho_e(x) + w_2 \rho_p(x) + w_3 \rho(x))$$

This minimum is understood in the deterministic sense if short time prediction, which is usually unavailable, is available. Alternatively, this minimum is understood in the stochastic sense by using expectation values and either a stochastic model of the power generation or a scenario based approach. When the optimization algorithm is a stochastic optimization and optimization criteria is described in the following formula:

$$\min_x E(w_1 \rho_e(x, z) + w_2 \rho_p(x, z) + w_3 \rho(x))$$

An expectation operator E{ } is defined regarding a variable z, which includes all the power values of the renewable power plant during the one step. Further, the single power values (random variable) $z_i$ can be given as pure probability model, by use of scenario based approaches or by use of distribution function of the prediction error.

The total symbolic notation is summarized in FIG. 15. FIG. 15 shows an overview of optimization principle.

The constraints can be divided into energy schedule constraints, device constraints and power output shape constraints.

Especially, the power output shape constraints and the energy schedule constraints (for example, the time variant tolerances) depend on grid operation characteristic and grid operation state. It is an essential point of this invention to feed the SPP-EMS with this information. The output of the optimization is a battery power sequence, however, only the first value of the sequence is actually taken for output.

Integration of the Operation Method into the Battery Sizing Method

Figure 10:
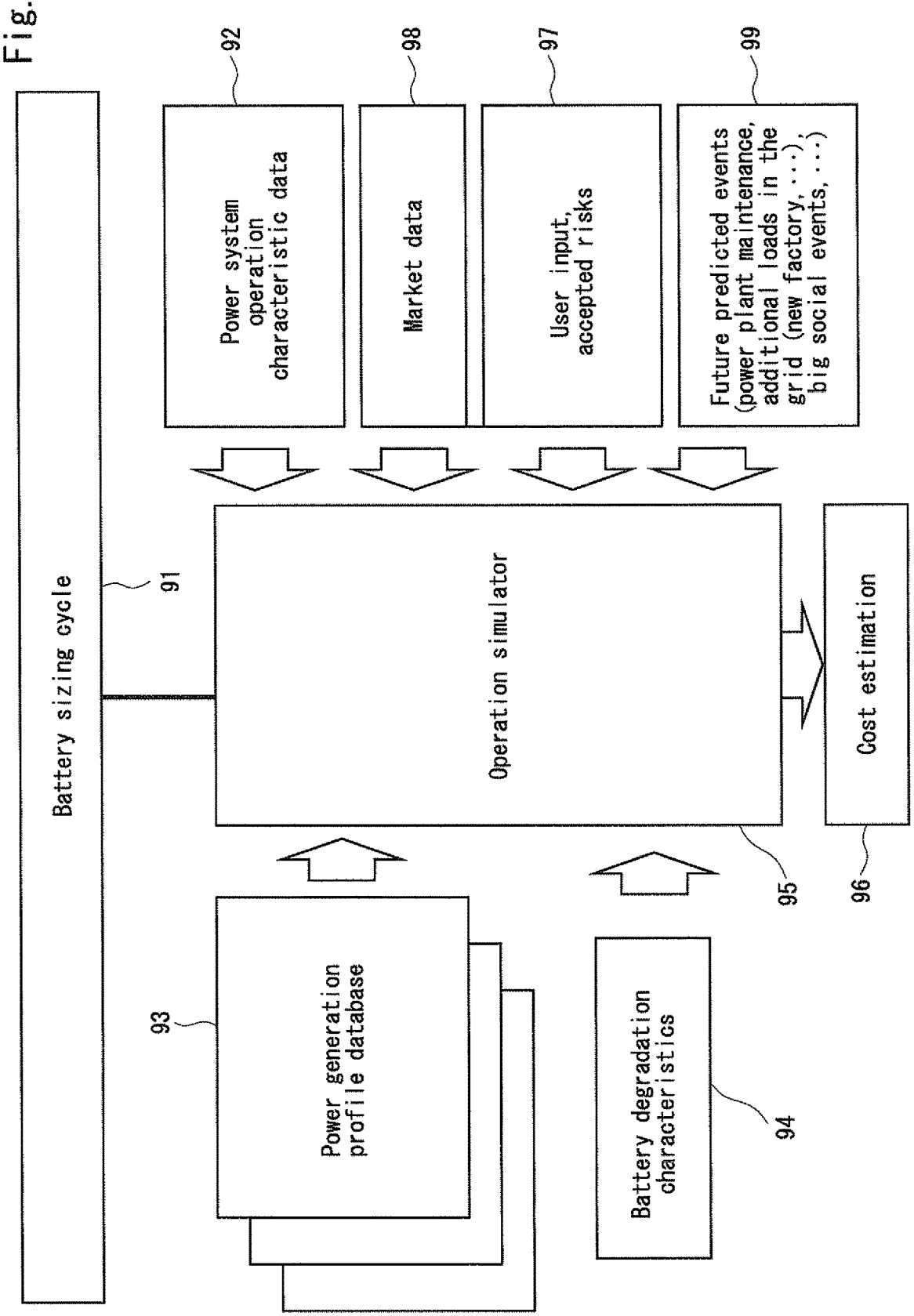
FIG. 10 is a diagram showing a battery sizing method with operation simulator.

In actual operation, operation follows after the design of the system. One of the most important aspects with this kind of systems is to size the controllable plant (the battery). For the battery sizing, the method as shown in FIG. 10 is introduced by this exemplary embodiment. The battery sizing method is fed by past renewable power production and prediction data which are stored in a power generation profile database 93, grid operational characteristic and grid past states (the degree of detail of this kind of data varies) which are included in a power system operation characteristic data 92, by the battery degradation characteristic model 94 and also by some preferences and risk acceptance level of the operator of the system.

Procedure for battery sizing is as follows. Operation simulator 95 which includes the battery sizing method and the SPP-EMS method described in this exemplary embodiment execute the procedure for battery sizing in the battery sizing cycle 91 using data described above, preferences (for example, user input of accepted risks 97), an input market data 89 (history), and future predicted events 99 to generates cost estimation 96 which is combined operation simulation results, battery degradation model, and power system operation cost. The future predicted events 99 include power plant maintenance, additional loads in the grid (in new factory), and big social events and so on.

Following components are used for the battery sizing. The components includes the power generation and past prediction profile database; Grid characteristics, past grid states and energy prices; User input and preferences, operation simulator and overall cost estimator (such as CAPEX (Capital Expenditure), OPEX (Operating Expense), and grid operator cost estimation).

Figure 11:
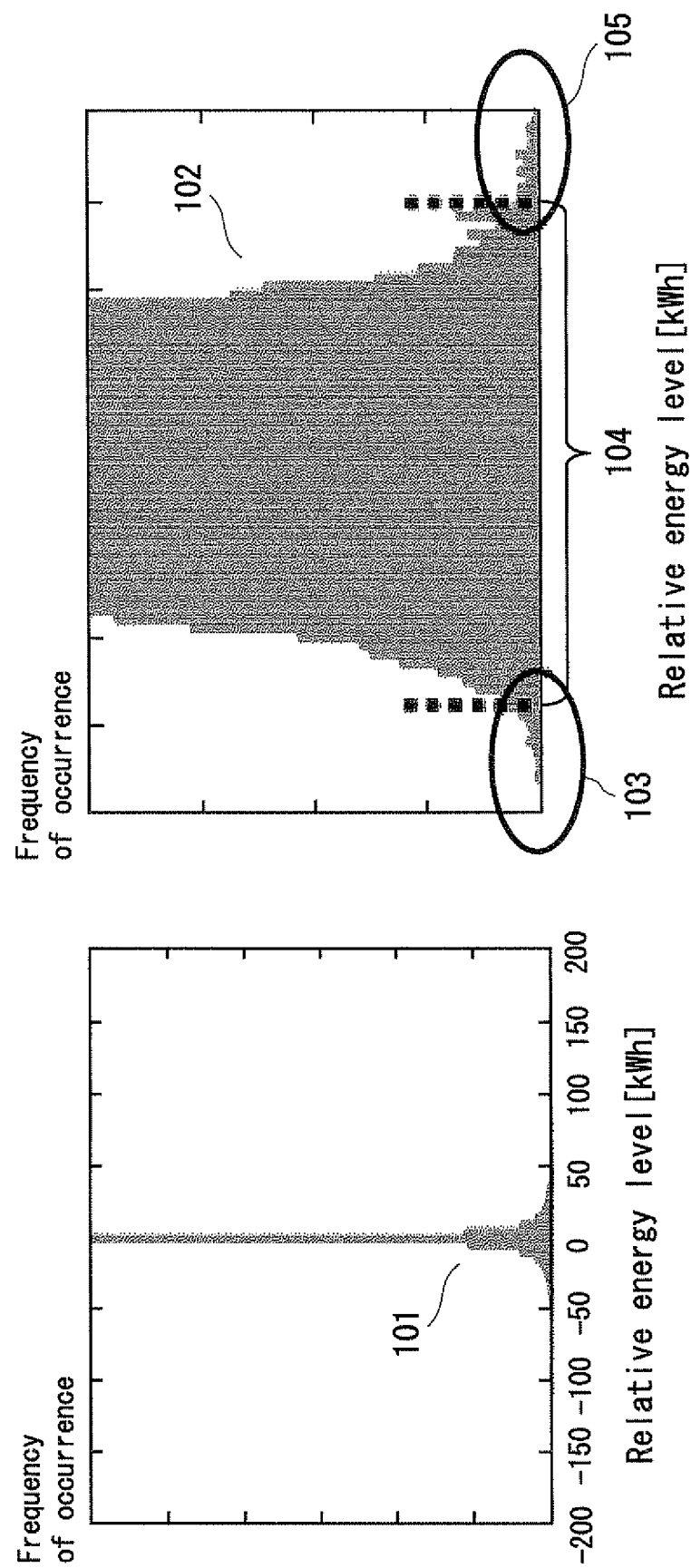
FIG. 11 is a diagram showing an energy state frequency of occurrence evaluation in a part of battery sizing method.

Different battery configurations are tested in the operation simulator 95, which executes the method described above. Additionally, the frequency of occurrence of the different energy states is analyzed. FIG. 11 shows an energy state frequency of occurrence evaluation in a part of battery sizing method. The right side graph is an enlarged view of a part of the left side graph. Frequency of occurrence of battery states is denoted as 101 and 102. As shown in FIG. 11, most energy states (level) appear very rare (a rare low energy states 103 and a rare high energy states 105). By allowing a schedule deviation during some interval during the year, battery size can be drastically reduced (denoted as a reduced battery size 104).

However, the battery sizing method cross-checks with the available grid information (available reserve capacity) and estimates the feasibility and additional cost for the grid operation due to this measure.

Figure 12:
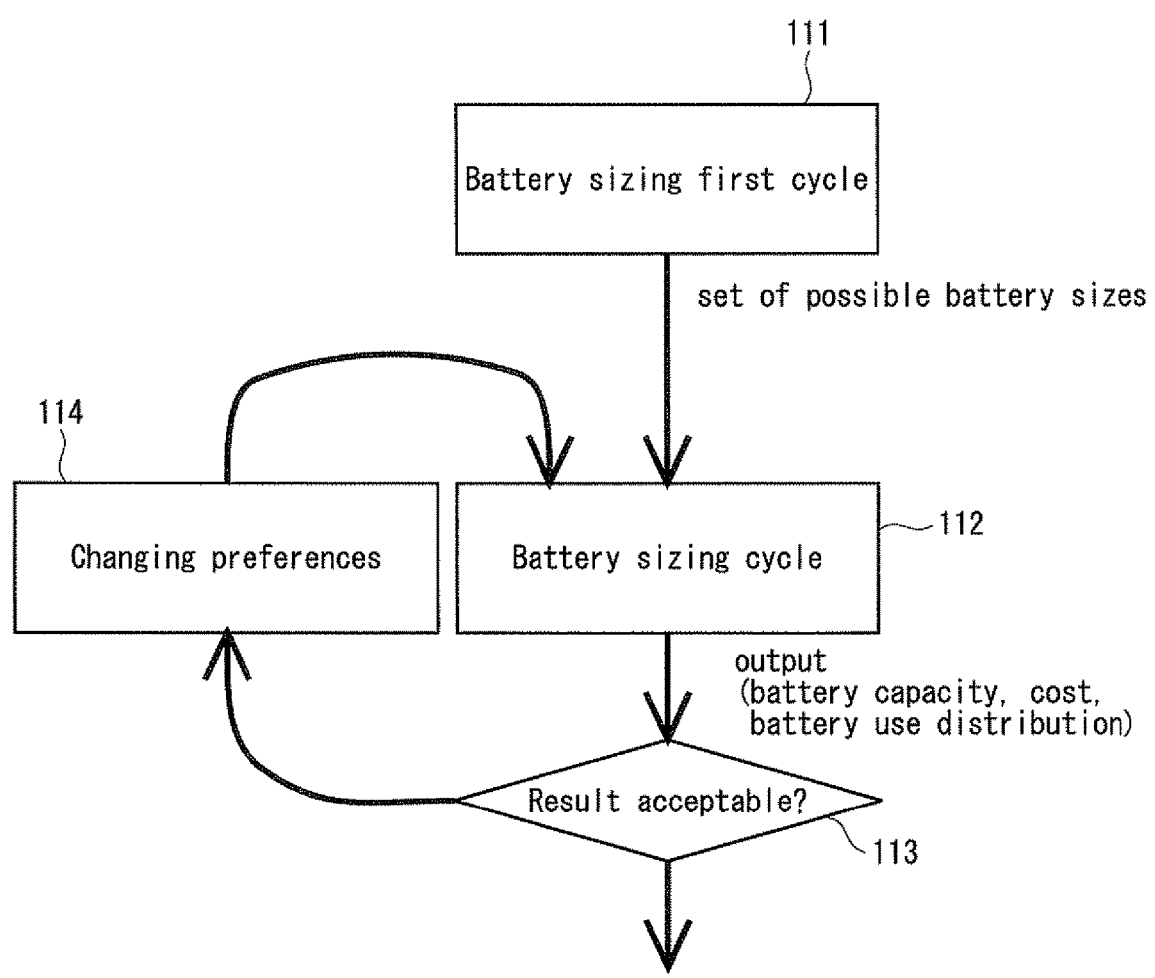
FIG. 12 is a flowchart showing a principal battery sizing method.

FIG. 12 is a flowchart showing a principal battery sizing method. In the battery first sizing cycle (step 111), possible battery size is set using a battery first sizing module. Then the battery sizing cycle (step 112), the battery capacity, the battery use distribution and the different cost (battery degradation cost, cost for the grid operator due to schedule deviation) are output as final output. The user can decide if the results are acceptable or not (step 113). If the results are not acceptable, preferences or other parameters are changed (step 114) and a new battery sizing cycle (112) is initiated.

Figure 13:
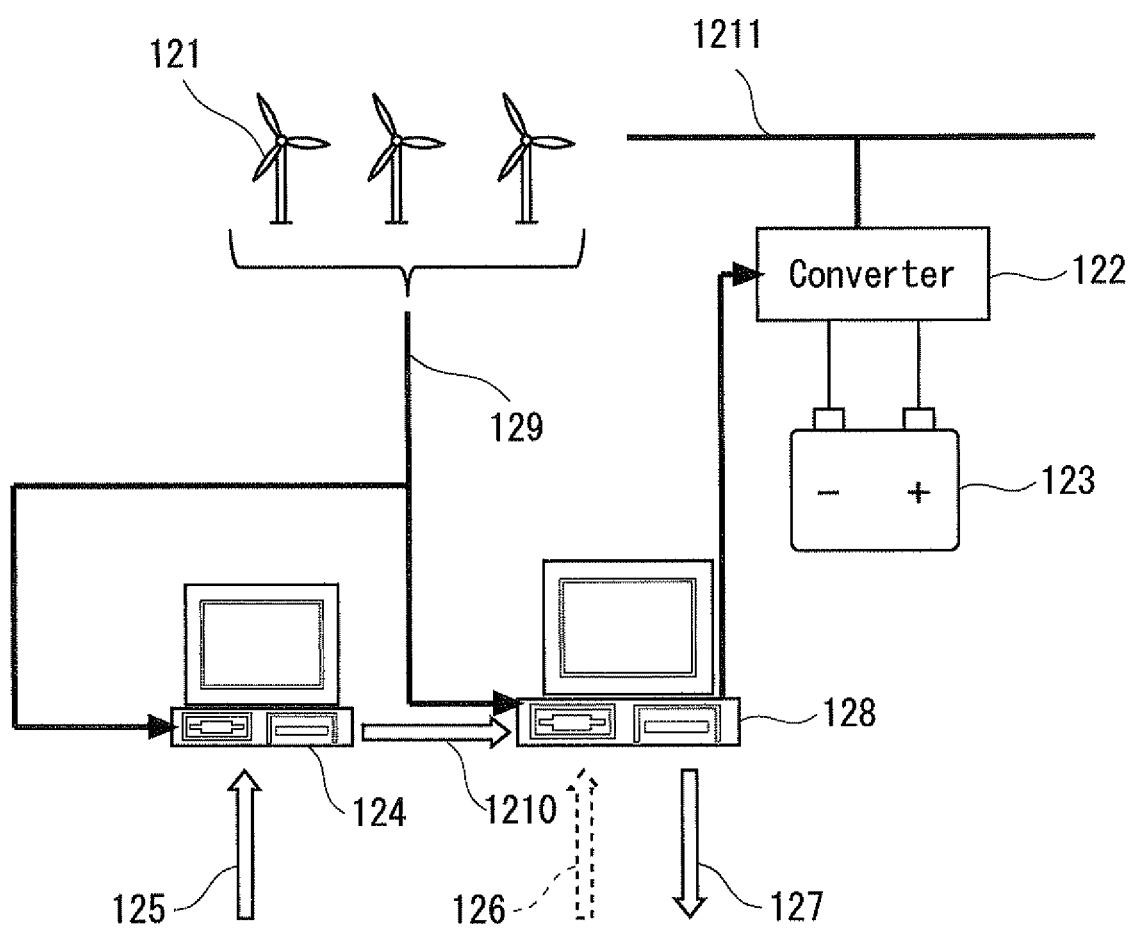
FIG. 13 is a diagram showing an exemplary embodiment of a renewable power plant system.

FIG. 13 shows an exemplary embodiment of a renewable power plant system. In the example of FIG. 13, a wind power farm 121 is combined with grid scale battery 123. The grid-scale battery 123 is connected to the electrical grid 1211 via a power conditioning device (convertor 122 in this example). There is a prediction system 124 available. The prediction system 124 has access to the measurements 129 of the wind farm 121. The measurements include a wind speed, a power production and so on. Further, the prediction system 124 has access to the internet 125. The prediction system 124 can access databases, and obtain weather prediction, information about other wind farm in the region, satellite data, and historical data and so on.

The Energy Management System (SPP-EMS) 128 has also access to the wind farm measurements. Additionally, SPP-EMS 128 is fed by the prediction data 1210 and grid operation state data 126. The output of the SPP-EMS 128 is twofold. The SPP-EMS 128 sends to the grid operator or other interested entities its schedule for the next k steps (127) according to above formula: E (t+Tp). Further, the SPP-EMS 128 sends to the output command for the power conditioning device (convertor 122 in this example).

It is assumed that the time step lasts 30 min. Inside the time step, a representative sample of scenarios for power production is available. It can be expected from future wind power prediction technology (for example with 1 minute values).

So, the system in each time step, uses the within time step prediction which may result in some representative scenarios and uses the method according to FIG. 5, where the optimization interval within one time step is indicated. The optimization interval gets smaller with progressing of time and the optimization is carried out according to FIG. 15.

Figure 14:
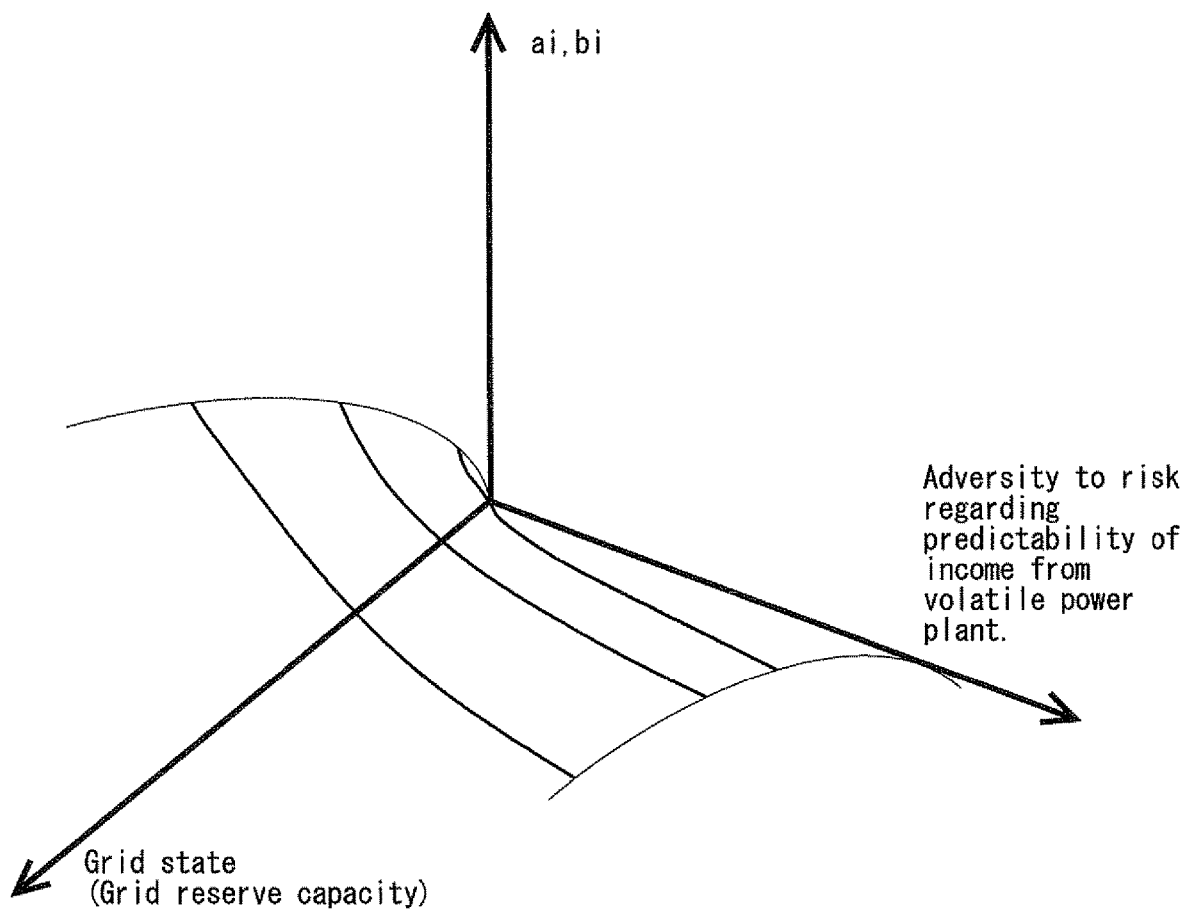
FIG. 14 is a diagram showing characteristics for determination of scheduled energy level differences $a_i$, $b_i$.

FIG. 14 shows characteristics for determination of scheduled energy level differences ai, bi. The time variant tolerances depend on the actual grid state (available grid reserve capacity) and the desired level of risk regarding return from sold energy from the system as shown in FIG. 14.

As far as the "schedule correction algorithm" is concerned, the two digital filters are set to following transfer functions: $F1(s)=s/(1+sT1)$ and $F2(s)=s/(1+sT2)$, where T1 and T2 are set to low time constants.

The parameters k1i, k2i are decided according to a rule-base as shown in FIG. 16.

For battery sizing and the operation algorithm of the SPP-EMS, the system and method described above is used.

The exemplary embodiment relies on the combination of three special new methods for guaranteeing advantageous power output from the perspective of grid operation together with keeping the energy schedule for a certain period within certain tolerances and reasonable, economic battery (or controllable plant) size. As step a time interval (typically in the range of 30 minutes) is considered.

The most important effect of this invention is keeping the energy schedule within a certain range for a renewable power plant combined with controllable plant by keeping the needed power and energy capacity of controllable plant low and guaranteeing favorable (from the grid operation perspective) total power output shape.

Method 1: During the step size of the energy schedule, different optimization intervals are considered (a step becoming shorter with increasing time) together with grid operation state and characteristics in order to achieve favorable output power shape and the energy schedule within certain tolerances.

Method 2: The energy schedule is changed after k steps in order to correct for increasing/decreasing SoC level due to deviation of power production from predicted values. In this correction future expected uncertainty levels and market prizes, grid state and characteristics of grid operation are included.

Method 3: Battery sizing is done based on an iterative cycle where method 1 and method 2 are applied to real past operation data including future events (market aspects) which can be predicted to keep a needed capacity of the plant regarding power and energy small. The evaluation grid operation characteristics and state is concerned to find a minimal battery size which leads to minimal overall operation cost. In the case of a battery, battery's energy capacity (kWh) and battery's power capacity (kW) is reduced. The future event includes, for example, power plant maintenance, big social events, new loads such as factories, buildings, stadiums.

According to the above exemplary embodiment, the problems described above are solved as follows.

Problem I is solved since a special prediction and grid state and prediction uncertainty, market condition aware "schedule changing method" is used to reduce battery size.

Problem II is solved since the changing window size based constrained optimization considers the appropriateness of the power output shape by incorporating appropriate power output shape constraints such as limiting the size of jump occurring, guaranteeing smoothness and so on.

Problem III is solved since optimization approach considers grid characteristics and grid operation state in the optimization algorithm within one step and in the schedule changing method.

Problem IV is solved since the battery sizing algorithm (which is based on simulation of the operation according to the method described above) considers partly non-fulfillment of the energy schedule considering the impact on the grid operation cost and cost for additional procurement of energy or consumption of energy also from grid operator perspective and/or market characteristic.

If the plurality of renewable power plants and the plurality of controllable plants are considered at once by generalizing the optimization algorithm within the one step, the prediction correction algorithm became the multivariable case instead of the scalar case.

As described above, the volatility of the power and energy production of the renewable plant and the associated controllable plant make it difficult to predict power and energy during a defined period for electric grid stability (supply/demand balance and so on). Countermeasure for approaching this problem should be economic and cost of additional equipment and operation moderate so that overall profitability can be achieved.

According to the exemplary embodiment, in order to overcome these problems, a renewable power plant is more predictable ("schedulable for the next k steps"). This exemplary embodiment is applied to renewable power plant in combination with controllable plants (such as different kind of storage system or others, also a load working on a batch process can be considered as a kind of storage, or a power source with a storage (tank) can be considered). It guarantees an energy schedule for a certain period (k time-steps) within a predefined tolerance (lower and upper limit). Power output profiles exhibit advantageous properties considering also grid characteristics and grid operation state.

This method combines optimization of power production within one step with an energy schedule prediction correction of schedule changing method (after k time steps). By doing so, the needed capacity of the storage (energy/power) is kept as small as possible. Meanwhile, the output power is shaped in an optimal way, considering the uncertainty or underlying probability structure (stochastic model or scenario based) of the production during one time step. Therefore, the method tries to avoid using undesired power output profiles during one step (typically 30 min).

By integrating the method into a battery sizing method, the frequency (in the sense of frequency of occurrence) of certain energy states of the battery (or these general storage type systems mentioned above) is also analyzed. It allows for non-observance of the energy schedule during certain periods and outputs the cost from overall grid perspective (operation and market), therefore the ideal battery size is determined.

INDUSTRIAL APPLICABILITY

This invention can be used for wind power plant and/or PV (photovoltaic power) plant integrated in the grid by use of controllable plants such as large storage system or distributed storage systems or c loads. PPS (Power Producer and Supplier) can use this method to minimize the impact of the introduction of a simple or combined renewable power resource on the grid stability.

REFERENCE SIGNS LIST

11 Controllable plant (battery)
12 Renewable power plant
13 Total output power
14 Schedulable power plant Energy Management System (SPP-EMS)
15 Prediction module
21 Controllable plants (batteries)
22 Renewable power plants
23 Total output power
24 Schedulable power plant Energy Management System (SPP-EMS)
25 Prediction module
31 Total output power
32 Energy
33 Step-size
41 Duration of correction interval (k steps)
42 Realized mean power (Mean power from renewable plant(s))
43 Predicted mean power (derived from predicted energy per one step size)
44 Changed energy schedule
45 Realized mean power profile (example)
51 Optimization interval for optimal power sequence computation
52 Total power output result
61 Resulting energy level (integral over battery power) without prediction correction method
62 Battery power (y-z)
63 Needed battery capacity for compensation
71 Resulting energy level (integral over battery power) without prediction correction method
72 Battery power (y-z)
73 Needed battery capacity for compensation
81 Predicted mean output power level
82 Realized mean output power level
83 Corrected mean output power level (given by the other energy schedule)
91 Battery sizing cycle
92 Power system operation characteristic data
93 Power generation profile database
94 Battery degradation characteristic model
95 Operation simulator
96 Cost estimation
97 Preferences
98 Market data
99 Future predicted events
101 Frequency of occurrence of battery states
102 Frequency of occurrence of battery states
103 Rare low energy states
104 Reduced battery size if allowance of schedule deviation during some intervals
105 Rare high energy states

What is claimed is:

1. A renewable power system having a renewable power plant and a controllable plant, comprising;
an energy management system which keeps an energy schedule within a certain tolerance in the next k (an integer greater than or equal to 1) steps by using a method that includes an optimization algorithm for a total power output shape within a one step, and schedule changing algorithm for changing the energy schedule after the next k steps to keep a needed capacity of the controllable plant regarding power and energy small,
wherein the schedule-changing algorithm is described by the following formula:

$E\text{ corr,sched}(i+k) = E\text{pred}(i+k) + k1, i\, F1\{(E\text{real}(i) - E\text{pred}(i))\} + k2, i\, F2\{(SoC(i) - SoCdes, i)\}$ wherein k1,i and k2,i, SoCdes,i are time-variant parameters that is chosen in a way that the renewable power system stability is kept, and
wherein the operators F1 {.} and F2{.} are realized as digital filters.

2. The renewable power system according to claim 1, wherein the time variant parameters k1,i, k2,i and SoCdes,i are dependent on an estimated future uncertainty of a predicted power of the optimization algorithm.

3. The renewable power system according to claim 2, wherein the time variant parameters are additionally dependent on predicted future prices obtained for power and/or energy.

4. The renewable power system according to claim 2, wherein the time variant parameters are additionally dependent on an operation state of a grid in which the renewable power plant is introduced.

5. The renewable power system according to claim 1, wherein a tolerance parameter for achieving the energy schedule depends on a grid and a market state.

6. The renewable power system according to claim 1, wherein more renewable power plants and more controllable plants are considered at once by generalizing the optimization algorithm within the one step.

7. A renewable power system having a renewable power plant and a controllable plant, comprising;
an energy management system which keeps an energy schedule within a certain tolerance in the next k (an integer greater than or equal to 1) steps by using a method that includes an optimization algorithm for a total power output shape within a one step, and schedule changing algorithm for changing the energy schedule after the next k steps to keep a needed capacity of the controllable plant regarding power and energy small,
wherein the optimization algorithm used within a single time step is a stochastic optimization and optimization criteria is described in the following formula:

$$\min_{x} E(w_1 \rho_e(x, z) + w_2 \rho_p(x, z) + w_3 \rho(x))$$

wherein an expectation operator E{ } is defined regarding a variable z, which includes all the power values of the renewable power plant during the one step, and wherein the single power values (random variable) $z_i$ can be given as pure probability model, by use of scenario based approaches or by use of distribution function of a prediction error.

* * * * *